March 10, 1925. 1,528,843
O. S. OLESEN
HOE
Filed Feb. 18, 1924
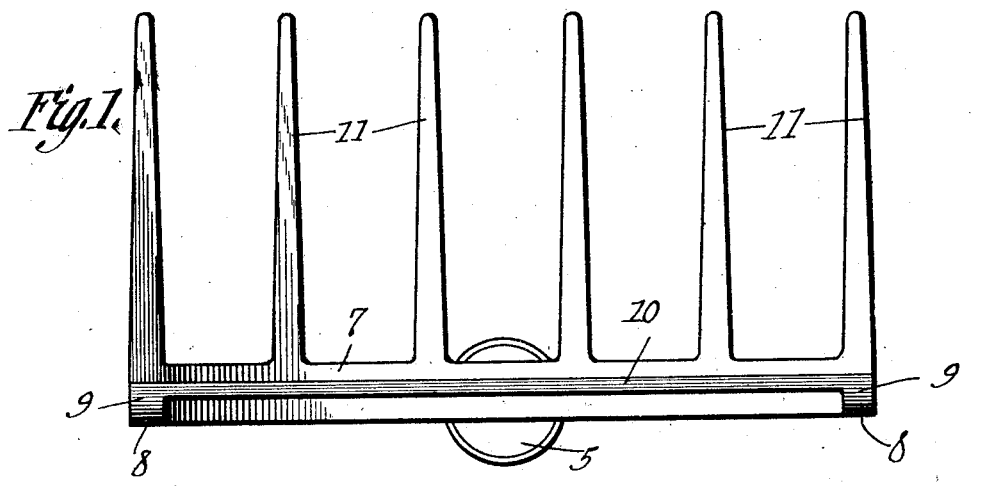
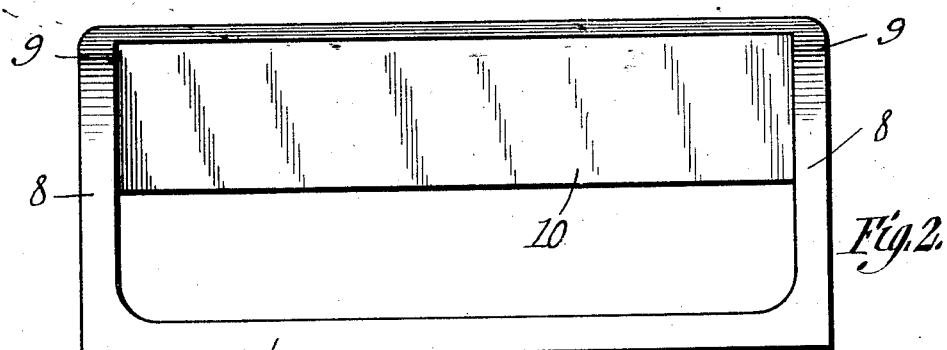
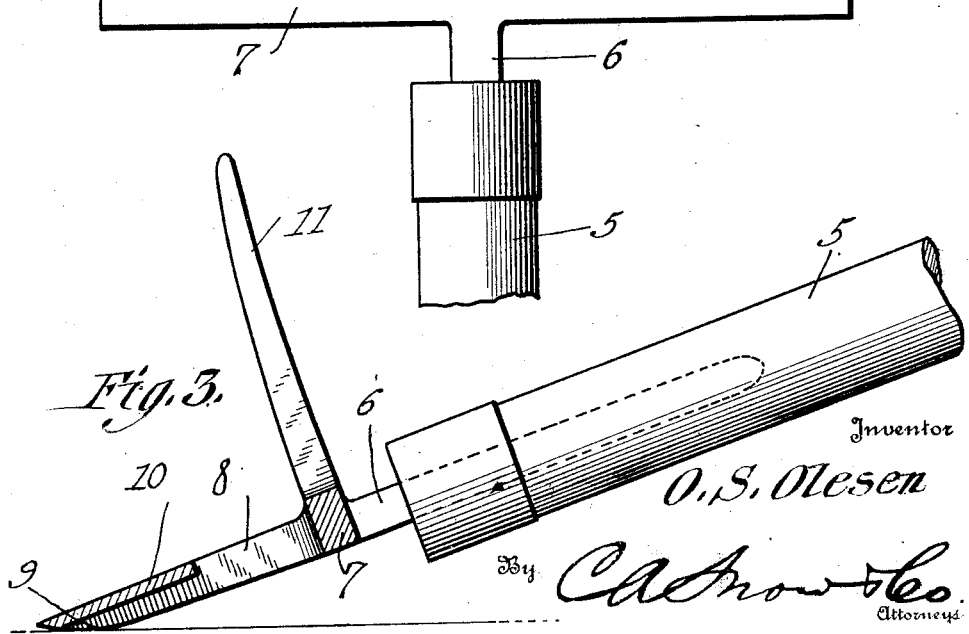
Inventor
O. S. Olesen
By C. A. Snow & Co.
Attorneys Patented Mar. 10, 1925.

1,528,843

UNITED STATES PATENT OFFICE.

OLE SORENSEN OLESEN, OF PLEASANTON, CALIFORNIA.

HOE.

Application filed February 18, 1924. Serial No. 693,621.

*To all whom it may concern:*

Be it known that I, OLE S. OLESEN, a citizen of the United States, residing at Pleasanton, in the county of Alameda and State of California, have invented a new and useful Hoe, of which the following is a specification.

This invention relates to agricultural implements and aims to provide a combined rake and scuffle hoe.

An important object of the invention is to provide a scuffle blade wherein by tilting the handle of the implement the blade may be caused to dig at various depths to adapt the implement for various usages.

An important object of the invention is the provision of an implement wherein the teeth of the rake extend at right angles to the scuffle blade so that the device may be efficiently employed as a rake and upon reversing the implement, the blade will lie in such relation with respect to the handle that the implement may be forced backward and forward to accomplish the scuffling result.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is an end elevational view of the implement constructed in accordance with the invention.

Figure 2 is a bottom plan view thereof.

Figure 3 is a sectional view taken through the implement.

Referring to the drawing in detail, the reference character 5 designates the handle of the tool which is formed with an opening in one end thereof designed to receive the shank 6 of the handle, by means of which the head is secured to the handle.

The head embodies a rectangular frame indicated generally by the reference character 7, which frame includes side members 8 that have curved forward edges 9 acting as runners or gauges for the blade 10 or scuffle hoe of the implement.

Extending at right angles to the frame 7 are parallel teeth 11 which constitute a rake structure, whereby the implement may be inverted for use as a rake for removing foreign matter or loosening the ground surface for cultivating purposes.

From the foregoing it will be obvious that due to the construction of the runners and scuffle blade 9 the tool may, by raising or lowering the handle, operate with a degree of accuracy at various depths as for an example, should it be desired to remove relatively large plants on a road surface, it would be necessary to dig deep whereupon the handle 5 would be moved to cause the blade 10 to enter the ground surface at say, a forty-five degree angle, while should it be desired to remove relatively small plants, the handle 5 will be tilted to cause the blade to operate at a greater angle with respect to the ground surface.

It is further pointed out that due to this construction, it is impossible for a person to dig into a ground surface such as a road bed to such a degree as to cause objectionable holes to be made therein.

I claim:—

A garden implement including a handle, a head having a shank extending into the handle, a frame formed integral with the shank, and including side members disposed in parallel relation with the handle, said side members being relatively wide and having the lower edges thereof beveled to provide runners, and a blade formed integral with the side members and having a beveled edge forming a continuation of the beveled edges of the side members.

In testimony that I claim the foregoing as my own, I have hereto affixed my signature in the presence of two witnesses.

OLE SORENSEN OLESEN.

Witnesses:
 ANSON M. ANDERSEN,
 J. C. MENDONCA.